DEVICE FOR INTEGRATING A MODULATED A.C. SIGNAL
Filed Oct. 19, 1965
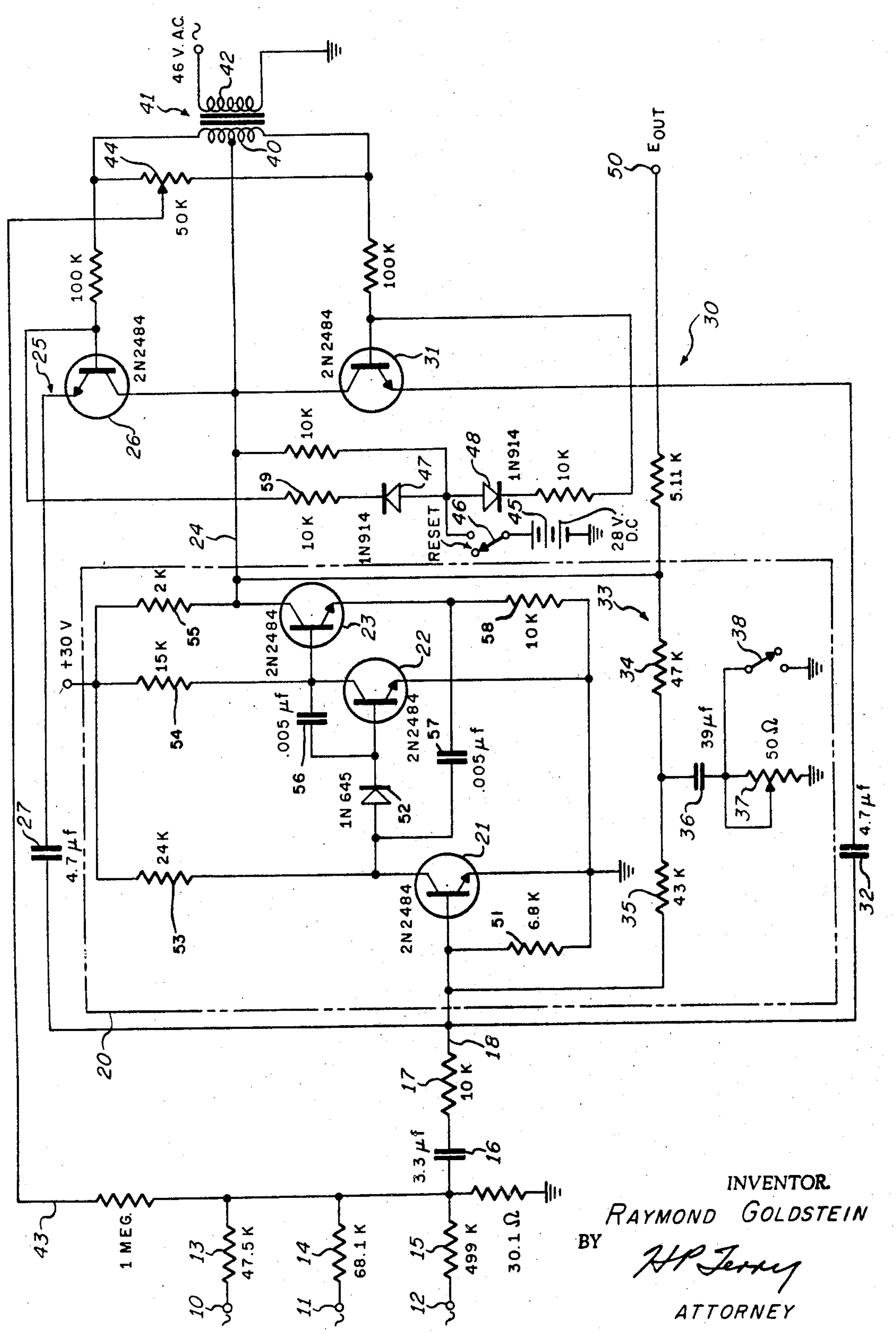
INVENTOR.
RAYMOND GOLDSTEIN
BY
ATTORNEY

United States Patent Office 3,466,434
Patented Sept. 9, 1969

3,466,434

DEVICE FOR INTEGRATING A MODULATED A.C. SIGNAL

Raymond Goldstein, North Ridge, Calif., assignor to Sperry Rand Corporation, a corporation of Delaware

Filed Oct. 19, 1965, Ser. No. 497,904
Int. Cl. G06g *7/18*
U.S. Cl. 235—183 6 Claims

ABSTRACT OF THE DISCLOSURE

The invention pertains to an A.C. integrating circuit in which first and second switching transistors disposed in series with first and second capacitors in first and second feedback connections respectively are alternately rendered conductive to provide full wave integration of an amplitude modulated A.C. signal and are simultaneously rendered conductive to reset the capacitors to a quiescent state.

The present invention relates to an A.C. integrating device whereby the integration of a modulated A.C. input signal is accomplished directly.

The present invention permits the attainment of long time constant integration directly with an A.C. amplifier rather than extracting the sideband intelligence by demodulation and obtaining the integral term through a D.C. feedback amplifier. Previously integration of modulated A.C. signals required first demodulating the A.C. signal to provide a proportional D.C. signal, then integrating the D.C. signal and ultimately remodulating the integrated D.C. signal to provide an integrated A.C. signal. D.C. type integrators could not integrate the modulated A.C. signal directly since the integration would have been performed on the carrier rather than on the modulating signal. The prior art method of integrating an A.C. signal is therefore unduly complex and does not always provide an accurate output signal due to the many steps involved of demodulating, integrating and remodulating.

Accordingly, the present invention provides for direct integration of a modulated A.C. signal by means of an A.C. operational amplifier. The present invention is an improvement over the technique disclosed in U.S. Patent 2,969,182, issued Jan. 24, 1961 in that the present invention provides a more compact device and eliminates the necessity for cumbersome transformers and also provides enhanced performance by virtue of its unique configuration and the use of solid state devices. Further, the present invention provides a unique manner of simultaneously discharging the capacitors in order to reset them to a quiescent state and also provides a variable gain feature which controls the time constant of the device to permit flexibility in its application.

It is a primary object of the present invention to provide an A.C. integrating device for directly integrating A.C. signals which is compact, versatile and inexpensive.

It is another object of the present invention to provide an integrating device for integrating A.C. signals directly in which certain components serve dual operational and reset functions.

It is an additional object of the present invention to provide an integrating device for directly integrating A.C. signals in which the integrating time constant is readily adjustable.

It is yet an additional object of the present invention to provide an integrating device for directly integrating an implitude modulated A.C. signal and providing an amplitude modulated output signal whose modulation is the time integral of the modulation of the input signal.

These and other objects will become apparent by referring to the drawing and subsequent description in which the single drawing shows an electrical wiring schematic of an A.C. integrating device incorporating the present invention.

Referring to the drawing, one or more modulated A.C. input signals may be applied through input terminals 10, 11 and 12, for example, to provide data representative of displacement, rate and acceleration terms to respective weighting resistors 13, 14 and 15. The modulated A.C. input signal is connected through a blocking capacitor 16 and a resistor 17, the latter forming the common resistive component of RC circuits to be explained, and thence to the input terminal 18 of a high gain three-stage amplifier 20. The three-stages of the amplifier 20 are defined by transistors 21, 22 and 23. Amplifier input terminal 18 is connected to the base electrode of transistor 21 whose collector electrode is connected through diode 52 to the base terminal of transistor 22. Capacitor 56, connected between the collector and base of transistor 22, provides a negative feedback circuit around the transistor 22 to prevent high frequency oscillation. The collector electrode of transistor 22 connects to the base terminal of transistor operating potentials for the three amplifier stages. The 23. Capacitor 57 provides a negative feedback path around the transistors 22 and 23 to improve amplifier linearity. Transistor 21 is constrained to operate in linear fashion by the application of the bias potential to its base electrode from the voltage divider comprising the serially connected resistors 55, 34, 35 and 51 disposed between a +30 v. voltage supply (indicated by the legend) and the grounding terminal. Diode 52 provides a small increase in potential between the collector of transistor 21 and the base of transistor 22 to effectuate a minor improvement in the operation of the first amplifier stage 21. A +30 v. voltage supply (indicated by the legend) through resistors 53, 54, 55 and 58 provides the remaining amplifier 20 also has an output terminal 24. A first feedback connection 25 between the amplifier output 24 and the amplifier input 18 includes a switching transistor 26 connected in series with a capacitor 27. The capacitor 27 is cooperative with the resistor 17 to form a first integrating type RC circuit. Similarly, a second feedback connection 30 between the amplifier output 24 and the amplifier input 18 includes a switching transistor 31 connected in series with a capacitor 32. The capacitor 32 is cooperative with the resistor 17 to form a second integrating type RC circuit.

A third feedback connection 33 is connected between the amplifier output 24 and the amplifier input 18. The third feedback connection 33 includes series connected resistors 34 and 35 which have their junction connected to ground potential by means of a shunting capacitor 36 and a variable resistor 37. The junction of the capacitor 36 and the variable resistor 37 may also be connected through a switch 38 directly to ground potential for providing a maximum time constant in a manner to be more fully explained.

In order to alternately render the capacitor 27 and the capacitor 32 effective in synchronism with the A.C. carrier input signal, the base electrodes of the switching transistors 26 and 31 are respectively connected to the opposite extremities of the secondary winding 40 of a transformer 41 which has its primary winding 42 energized by a reference voltage synchronized with the A.C. carrier input signal. The secondary winding 40 is center-tapped and connected to the amplifier output 24. This provides a reference signal of one phase to the base of one of the switching transistors 26 or 31 while simultaneously providing a reference signal of the opposite phase to the base of the other transistor thereby causing the transistors 26 and 31 to conduct, i.e., switch, sequentially in a manner to be more fully explained.

A connection 43 is provided from the junction of the input resistors 13, 14 and 15 to the wiper arm of a variable resistor 44 which is connected across the secondary winding 40 for null balancing purposes.

To provide for simultaneously discharging the condensers 27 and 32 in order to permit them to return to a quiescent state, a D.C. voltage source 45 is connected through a reset switch 46 and back-to-back diodes 47 and 48 to the respective base electrodes of the switching transistors 26 and 31, respectively. The diodes 47 and 48 are poled to permit conduction in the direction from the D.C. voltage source 45 to the respective base electrodes only. A detailed explanation of the simultaneous discharging of the condensers 27 and 32 will be provided subsequently.

An integrated output signal is proivded on output terminal 50 which is connected to the amplifier output 24 in a manner to be explained forthwith.

In operation, one or more modulated A.C. input signals are applied to the input terminals 10, 11 and 12 and pass through their respective resistors 13, 14 and 15 which provide a weighting function and through the blocking capacitor 16 and the resistor 17 to the input terminal 18 of the amplifier 20 where the signal is amplified and inverted in succession by transistor stages 21, 22 and 23. The amplified and inverted output signal appears at terminal 24. It is assumed that the switches 38 and 46 are both open as shown and the reference voltage applied to the transformer 41 provides a positive signal from the upper portion of the secondary 40 and a negative signal from the lower portion in order that the switching tarnsistor 26 is conducting while the switching transistor 31 is in a nonconducting state. During this half cycle, the charge on the condenser 27 builds up and the amplifier 20 functions as an operational amplifier with capacitor 27 cooperative with resistor 17 and the integrating time constant is established by the values of the RC circuit defined thereby and the feedback gain determined by the setting of the wiper of the potentiometer 37 on the third feedback connection 33. With the lack of a reset voltage applied through switch 46 since it is open as shown, the diodes 47 and 48 float back-to-back and have no effect on the normal operation of the device.

On the next half cycle, the phase on the secondary winding extremities reverses and the switching transistor 31 now conducts while the switching transistor 26 is in a nonconducting state. The switching control circuit is designed such that switching will occur effectively at the zero crossings of the control wave form. Thus, the charge on the capacitor 32 builds up and now the capacitor 32 forms an integrating type RC circuit with respect to the resistor 17, and has its time constant established as previously explained. It will be recognized that it is desirable for symmetrical operation to have the capacitors 27 and 32 and the transistors 26 and 31 substantially identical. For a symmetrical operation, obviously they would be designed accordingly. The output from the output terminal 50 is thus proportional to the change in voltage on the capacitors 27 and 32 and proportional to the integral of the applied A.C. input signal to provide a full wave integrated output signal.

The time ocnstant of the device may be varied by varying the gain through the third feedback connection 33 by adjusting the wiper arm of the variable resistor 37. To provide a maximum time constant, the switch 38 is closed thereby connecting the capacitor 36 directly to ground potential which may be desirable for example in mode switching where the variable resistor 37 might be adjusted to a particular time constant, for example, 200 seconds, and by closing the switch 38 the time constant may be increased by a factor of 10 or 100.

When it is desired to reset the device to a quiescent state, the reset switch 46 is closed thereby connecting the D.C. source 45 through the respective diodes 47 and 48 to the base electrodes of the respective switching transistors 26 and 31. The D.C. source potential overrides any signals emanating from the secondary winding 40 of the transformer 41 and causes both transistors 26 and 31 to be simultaneously energized and to conduct. Simultaneous conduction of the transistors 26 and 31 completes the circuit through the first and second feedback connections 25 and 30, respectively, to form a continuous discharge path or loop for the condensers 27 and 32 such that they rapidly discharge to a state determined by the potential difference between conductors 18 and 24 across which both capacitors 27 and 32 are connected. In the event capacitors 27 and 32 are charged to different potentials when switch 46 is closed, current from the more positively charged capacitor will flow through transistor switches 26 and 31 into the more negatively charged capacitor thus facilitating the return of integrating capacitors 27 and 32 to the quiescent voltage determined by the aforementioned difference of potential.

Typical values of the components for an operable A.C. integrating device are shown in the drawing.

It will be appreciated that in view of the present teaching many changes can be made in the device which fall within the scope of the present invention. For example, one-half wave operation may be proivded by utilizing only one of the feedback loops 25 or 30, and connecting the amplifier output 24 to ground potential during the non-integrating half cycle. Further the transformer 41 has been shown for purposes of simplicity of explanation only since it will be obvious that solid state elements could be arranged to provide a suitable reference signal.

While the invention has been described in its preferred embodiment, it is to be understood that the words which have been used are words of description rather than limitation and that changes may be made without departing from the true scope and spirit of the invention.

What is claimed is:

1. In an integrating device for integrating an amplitude modulated A.C. input signal and providing an amplitude modulated A.C. signal whose modulation is the integral of the modulation of said input signal, (1) amplifying means having an input and an output, (2) resistor means responsive to said A.C. input signal and connected to the input of said amplifying means, (3) first feedback connection means between said amplifier output and said amplifier input, said first feedback connection means including first capacitor means connected in series with first independently controllable switching means, (4) second feedback connection means between said amplifier output and said amplifier input, said second feeedback connection means including second capacitor means connected in series with second independently controllable switching means, (5) means for providing control signals to which said first and second independently controllable switching means are responsive for rendering said first and second independently controllable switching means sequentially conductive in synchronism with said A.C. input signal thereby providing a full wave integrated output from said amplifying means, and (6) resetting means for providing resetting signals to which said first and second independently controllable switching means are responsive for rendering said first and second independently controllable switching means simultaneously conductive thereby resetting said first and second capacitor means to a quiescent state.

2. A device of the character recited in claim 1 in which said first and second independently controllable switching means comprise first and second solid state switches respectively.

3. A device of the character recited in claim 2 in which said resetting means comprises (1) a source of potential for rendering conductive said first and second solid state switches, and (2) means for simultaneously coupling said source of potential to the control electrodes of said first and second solid state switches.

4. A device of the character recited in claim 3 in which said first and second solid state switches comprise first and second transistors respectively and in which said means for simultaneously coupling said source of potential comprises, (1) two diodes with first like electrodes connected together and with second like electrodes coupled respectively to the base electrodes of said transistors, and (2) a switch connecting said source of potential to said first like electrodes.

5. A device of the character recited in claim 4 in which said amplifying means includes means for selectively varying the gain of said amplfying means thereby selectively varying the time constant defined by said device.

6. A device of the character recited in claim 5 in which said means for selectively varying the gain of said amplifying means comprises a third feedback connection between said amplifier output and said amplifier input including, (1) first and second serially connected resistors, coupled between said amplifier output and said amplifier input, (2) a serially connected capacitor and third resistor coupled between the junction of said first and second serially connected resistors and a grounding terminal, and (3) a switch connected across said third resistor.

References Cited

UNITED STATES PATENTS

| | | | |
|---|---|---|---|
| 2,846,577 | 8/1958 | Blasingame | 235—183 |
| 2,891,174 | 6/1959 | Hawkins | 307—229 |
| 3,134,027 | 5/1964 | Gray | 235—183 |
| 3,296,613 | 1/1967 | Andersen et al. | 235—183 |

OTHER REFERENCES

Korn and Korn, Electronic Analog Computers (McGraw-Hill Book, Co.), 1956, second edition, pp. 178–182.

MALCOLM A. MORRISON, Primary Examiner

F. D. GRUBER, Assistant Examiner

U.S. Cl. X.R.

307—229; 328—127